US011530339B2

(12) United States Patent
Miura et al.

(10) Patent No.: US 11,530,339 B2
(45) Date of Patent: Dec. 20, 2022

(54) GRAPHIC SHEET, METHOD OF PRODUCING GRAPHIC SHEET, AND BUILDING STRUCTURE

(71) Applicant: 3M INNOVATIVE PROPERTIES COMPANY, St. Paul, MN (US)

(72) Inventors: Masami Miura, Higashine (JP); Yoshinori Araki, Sagae (JP); Yorinobu Takamatsu, sagamihara (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 159 days.

(21) Appl. No.: 16/769,685

(22) PCT Filed: Dec. 5, 2018

(86) PCT No.: PCT/US2018/064038
§ 371 (c)(1),
(2) Date: Jun. 4, 2020

(87) PCT Pub. No.: WO2019/113189
PCT Pub. Date: Jun. 13, 2019

(65) Prior Publication Data
US 2020/0325366 A1    Oct. 15, 2020

(30) Foreign Application Priority Data
Dec. 6, 2017   (JP) .............................. JP2017-234332

(51) Int. Cl.
| C09J 7/38 | (2018.01) |
| B32B 5/18 | (2006.01) |
| B32B 7/12 | (2006.01) |
| B32B 27/06 | (2006.01) |
| B32B 27/30 | (2006.01) |
| B32B 27/36 | (2006.01) |
| B32B 29/00 | (2006.01) |

(Continued)

(52) U.S. Cl.
CPC ................. *C09J 7/385* (2018.01); *B32B 5/18* (2013.01); *B32B 7/12* (2013.01); *B32B 27/065* (2013.01);

(Continued)

(58) Field of Classification Search
None
See application file for complete search history.

(56) References Cited

U.S. PATENT DOCUMENTS

| 4,002,792 A | 1/1977 | Petersen |
| 2006/0264549 A1 | 11/2006 | Rolland |

(Continued)

FOREIGN PATENT DOCUMENTS

| JP | 2003076308 | 3/2003 |
| JP | 2004330438 | 11/2004 |

(Continued)

OTHER PUBLICATIONS

International Search Report for PCT International Application No. PCT/US2018/064038, dated Mar. 22, 2019, 4 pages.

*Primary Examiner* — Chinessa T. Golden
(74) *Attorney, Agent, or Firm* — Vincent Pham

(57) ABSTRACT

A graphic sheet is provided that can be affixed with sufficient adhesive force onto wallpaper, a poster, or other substrate having comparatively low strength, and can be easily renewed without damaging the substrate, which is the underlying layer. A graphic sheet of an embodiment of the present disclosure includes: a base film layer having a first surface and a second surface situated on an opposite side of the first surface; and a tacky acrylic foam layer disposed on or above the second surface of the base film layer. The acrylic foam layer contains an acrylic polymer having 20 mass % or more of a unit derived from ethyl acrylate.

13 Claims, 1 Drawing Sheet

(51) Int. Cl.
  *B32B 37/02* (2006.01)
  *C09J 133/08* (2006.01)
  *C08F 220/18* (2006.01)

(52) U.S. Cl.
  CPC ............ *B32B 27/304* (2013.01); *B32B 27/36* (2013.01); *B32B 29/002* (2013.01); *B32B 37/02* (2013.01); *C08F 220/1804* (2020.02); *C09J 133/08* (2013.01); *B32B 2266/0242* (2013.01); *B32B 2266/06* (2013.01); *B32B 2307/3065* (2013.01); *B32B 2607/02* (2013.01); *C09J 2301/312* (2020.08); *C09J 2400/24* (2013.01); *C09J 2427/006* (2013.01)

(56) References Cited

U.S. PATENT DOCUMENTS

| | | |
|---|---|---|
| 2007/0218269 A1 | 9/2007 | Kato |
| 2010/0034995 A1 | 2/2010 | Tobita |
| 2016/0339672 A1 | 11/2016 | Kagiyama |
| 2018/0056625 A1 | 3/2018 | Ashida |
| 2019/0092980 A1 | 3/2019 | Sone |
| 2020/0298527 A1 | 9/2020 | Ashida |

FOREIGN PATENT DOCUMENTS

| | | |
|---|---|---|
| JP | 2008308527 | 12/2008 |
| JP | 2011104840 | 6/2011 |
| JP | 2012017386 A | 1/2012 |
| JP | 2013114137 | 6/2013 |
| JP | 2016116488 | 6/2016 |
| JP | 2016121312 | 7/2016 |
| JP | 2017218561 | 12/2017 |
| WO | WO 2001-079372 | 10/2001 |
| WO | WO 2007-060268 | 5/2007 |
| WO | WO 2013-081039 | 6/2013 |
| WO | 2014148299 | 9/2014 |
| WO | WO 2018/230323 | 12/2018 |

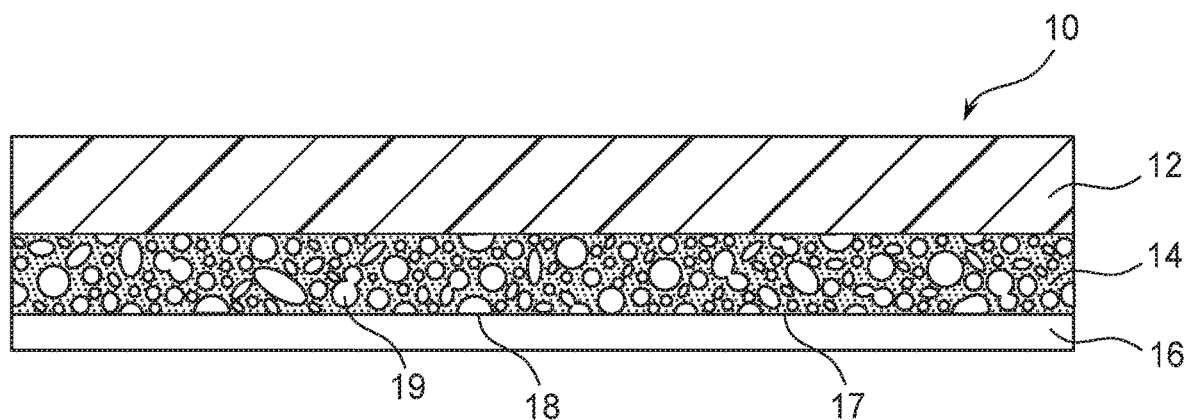

GRAPHIC SHEET, METHOD OF PRODUCING GRAPHIC SHEET, AND BUILDING STRUCTURE

CROSS REFERENCE TO RELATED APPLICATIONS

This application is a national stage filing under 35 U.S.C. 371 of PCT/US2018/064038, filed Dec. 5, 2018, which claims the benefit of Japanese Application No. 2017-234332, filed Dec. 6, 207, the disclosure of which is incorporated by reference in their entirety herein.

TECHNICAL FIELD

The present disclosure pertains to a graphic sheet, a method of producing the graphic sheet, and a building structure, and more particularly, pertains to a graphic sheet suited for interior applications, a method of producing the graphic sheet, and a building structure that includes the graphic sheet.

BACKGROUND ART

Graphic sheets that are provided with: a film substrate that supports a printed layer, and an adhesive layer are used in interior application such as in houses, stores and other commercial facilities, or public facilities such as city office buildings. Graphic sheets that are used for purposes such as temporary decorations and advertising are detached from an adherend after a prescribed period has passed, and are replaced with new or another type of graphic sheet.

Patent Literature 1 (JP 2003-076308 A) discloses a microsuction cup sheet that is used as a "so-called back surface affixed advertisement poster sheet that is affixed to a back surface of a transparent glass of a window, a transparent window glass of a vehicle, a transparent plastic plate, or the like so that a printed image is visible from the front side".

Patent Literature 2 (JP 2013-114137 A) discloses a foam body with a printed layer that is "favorably used for a back surface affixed advertisement poster that is affixed to a transparent adherend such as glass or a plastic film and for an advertisement sticker that can be affixed to the inside of glass of a train or vehicle".

CITATION LIST

Patent Literature

Patent Literature 1: JP 2003-076308 A
Patent Literature 2: JP 2013-114137 A

SUMMARY OF INVENTION

Technical Problem

As graphic sheets that are affixed to a substrate such as wallpaper, adhesive sheets having sufficient adhesive force with respect to the substrate have been conventionally used in order to prevent detachment from the substrate. However, unlike window glass and concrete for which peeling or damage of the substrate does not easily occur, for cases in which a used graphic sheet that has been affixed onto wallpaper made up of a polyvinyl chloride sheet or the like is to be renewed, when the affixed graphic sheet is peeled away, in some cases the wallpaper or the like that serves as the substrate may be also peeled away at the same time, or is damaged, and when this occurs, time and labor to remove the wallpaper or the like and apply the wallpaper once again are required. Graphic sheets that are used for purposes such as temporary decorations or advertisements are desirably renewed in a short period of time, and this requires that construction in association with renewing be carried out at a high frequency.

Therefore, an object of the present disclosure is to provide a graphic sheet that can be affixed with sufficient adhesive force onto substrate having comparatively low strength such as wallpaper and a poster, and can be easily renewed without damaging the substrate, which is the underlying layer.

Solution to Problem

According to an embodiment of the present disclosure, provided is a graphic sheet capable of being affixed to and detached from a substrate. The graphic sheet includes: a base film layer having a first surface and a second surface situated on an opposite side of the first surface; and a tacky acrylic foam layer disposed on or above the second surface of the base film layer. The acrylic foam layer contains an acrylic polymer having 20 mass % or more of a unit derived from ethyl acrylate.

According to another embodiment of the present disclosure, provided is a method of producing a graphic sheet capable of being affixed to and detached from a substrate. The method includes: providing a base film layer having a first surface and a second surface situated on an opposite side of the first surface; forming a tacky acrylic foam layer; and arranging a bonding layer on or above the second surface of the base film layer, and laminating the acrylic foam layer onto the bonding layer. The forming of the acrylic foam layer includes: foaming an acrylic foam precursor containing an acrylic polymer having 20 mass % or more of a unit derived from ethyl acrylate; molding the foamed acrylic foam precursor into a sheet; and curing the sheet of the foamed acrylic foam precursor.

According to yet another embodiment of the present disclosure, provided is a building structure that includes a substrate and the abovementioned graphic sheet arranged on a surface of the substrate.

Advantageous Effects of Invention

The graphic sheet of the present disclosure can be affixed with sufficient adhesive force onto wallpaper, a poster, or other substrate having comparatively low strength, and can be easily renewed without damaging the substrate, which is the underlying layer. Therefore, the graphic sheet can be applied and removed without leaving adhesive residue and without destroying the substrate even by a person not skilled in such work. The graphic sheet of the present disclosure can be suitably used as a graphic sheet for a temporary decoration or advertising in interior applications in houses, commercial facilities, and public facilities.

Note that the above descriptions should not be construed to be a disclosure of all of the embodiments and benefits of the invention.

BRIEF DESCRIPTION OF DRAWINGS

FIG. 1 is a schematic cross-sectional view of a graphic sheet of an embodiment of the present disclosure.

DESCRIPTION OF EMBODIMENTS

For the purpose of illustrating typical embodiments of the invention, embodiments of the invention are described in detail below with reference to the drawings, but the invention is not limited to these embodiments.

In the present disclosure, the term "sheet" encompasses articles called "films".

In the present disclosure, the term "(meth) acrylic" refers to acrylic or methacrylic, and the term "(meth) acrylate" refers to acrylate or methacrylate.

In the present disclosure, the term "tackiness (pressure sensitive adhesiveness)" refers to the characteristic of a material or composition that adheres to various surfaces with the application of light pressure in the temperature range of usage, such as from 0° C. to 50° C., and does not exhibit a phase change (from liquid to solid for example).

In the present disclosure, the term "transparent" refers to the graphic sheet or a material constituting the graphic sheet having a region with a total light transmittance of approximately 60% or greater, preferably approximately 80% or greater, and more preferably approximately 90% or greater in the visible light region (400 nm to 700 nm). The entire graphic sheet may be transparent, or one portion or a plurality of portions may be transparent. The total light transmittance can be determined in accordance with JIS K 7361-1:1997 (ISO 13468-1:1996).

The graphic sheet according to an embodiment of the present disclosure is capable of being affixed to and detached from a substrate, and is provided with: a base film layer having a first surface and a second surface situated on an opposite side of the first surface; and a tacky acrylic foam layer disposed on or above the second surface of the base film layer. "Disposed on the second surface of the base film layer" refers to the acrylic foam layer being disposed in direct contact with the second surface of the base film layer, and "disposed above the second surface of the base film layer" refers to the acrylic foam layer being disposed above the base film layer with another layer being interposed between the acrylic foam layer and the base film layer and thus, the acrylic foam layer being disposed without being in direct contact with the second surface of the base film layer. Abovementioned another layer may include a bonding layer for example. The definitions of the terms "on" and "above" that are mentioned with regard to other layers are the same as those described above.

FIG. 1 is a schematic cross-sectional view of a graphic sheet 10 according to an embodiment of the present disclosure. The graphic sheet 10 is provided with: a base film layer 12 having a first surface (upper surface in FIG. 1) and a second surface (lower surface in FIG. 1) situated on the opposite side of the first surface; and a tacky acrylic foam layer 14 disposed on the second surface of the base film layer 12. As illustrated in FIG. 1, the base film layer 12 and the acrylic foam layer 14 may be in direct contact, or may be adhered with a bonding layer being interposed therebetween. The base film layer 12 may have a surface treatment such as a primer treatment or a corona treatment on the contact surface with the acrylic foam layer 14 or other layers. In FIG. 1, a liner 16 (bottom surface in FIG. 1) is arranged as an optional constituent element on the acrylic foam layer 14.

As the base film layer, for example, films containing: an acrylic resin containing polymethyl methacrylate (PMMA); polyolefins such as polyurethane (PU), polyvinyl chloride (PVC), polycarbonate (PC), polyethylene (PE), and polypropylene (PP); polyesters such as polyethylene terephthalate (PET), and polyethylene naphthalate; a fluororesin; copolymers such as ethylene-vinyl acetate copolymer (EVA), ethylene-acrylic acid copolymer, ethylene-ethyl acrylate copolymer, ethylene-vinyl acetate copolymer, acrylonitrile-butadiene rubber (NBR), and acrylonitrile-butadiene-styrene copolymer (ABS); or mixtures thereof can be used.

From the perspectives of strength, impact resistance, and the like, a film containing a polyurethane, polyvinyl chloride, polyethylene terephthalate, acrylonitrile-butadiene-styrene copolymer or polycarbonate can be advantageously used as the base film layer. The base film layer can also function as a receptor layer for printing ink, and/or a protective layer for protecting the substrate surface from external puncturing, impact or the like. For a case in which the base film layer is made to function as a receptor layer for printing ink, a base film layer is advantageously a film containing polyvinyl chloride or polyurethane from perspectives such as printing suitability and solvent resistance (alcohol resistance for example). A film layer containing polyvinyl chloride is also advantageous for providing the graphic sheet with flame retardancy.

The base film layer may have a variety of thicknesses, but from the perspectives of strength and handling ease of the graphic sheet, the thickness of the base film layer can typically be set to not less than approximately 10 μm, not less than approximately 20 μm, or not less than approximately 50 μm, and not greater than approximately 500 μm, not greater than approximately 200 μm, or not greater than approximately 100 μm. The thickness of the base film layer in the case where the base film layer is not flat refers to the thickness of the thinnest portion of the base film layer. The base film layer may be embossed for example. The depth of the emboss finishing is typically within a range that is less than the thickness of the base film layer, and can be set to not less than approximately 1 μm, not less than approximately 2 μm, or not less than approximately 5 μm, and not more than approximately 50 μm, not more than approximately 20 μm, or not more than approximately 10 μm.

The base film layer may be transparent or opaque, and may be colored. In an embodiment, the base film layer is colored white. This embodiment is advantageous from perspectives such as the coloring and sharpness of an image created by a printed layer disposed directly or indirectly on the base film layer.

In an embodiment, the base film layer is solid. This embodiment does not have in the base film surface a discontinuous portion of the base film material such as ventilation holes for eliminating air bubbles to the outside, and therefore is advantageous from the aesthetic perspective of the graphic sheet.

The acrylic foam layer has tackiness, and contains an acrylic polymer having approximately 20 mass % or greater of a unit derived from ethyl acrylate. In several embodiments, the acrylic foam layer contains an acrylic polymer having approximately 22 mass % or more, approximately 24 mass % or more, or approximately 26 mass % or more, and approximately 55 mass % or less, approximately 50 mass % or less, or approximately 48 mass % or less of the unit derived from ethyl acrylate. By configuring the acrylic foam layer such that the acrylic polymer contained in the acrylic foam layer has a large amount of the unit derived from ethyl acrylate in comparison with an ordinary tacky acrylic polymer, that is approximately 20 mass % or more of the unit, the acrylic foam layer can be imparted with sufficient adhesive force for fixing the graphic sheet to a substrate such as wallpaper containing a polyvinyl chloride sheet, and with sufficient cohesive force for easily removing the graphic sheet from the substrate without leaving adhesive residue and without destroying the substrate.

The acrylic polymer having approximately 20 mass % or more of the unit derived from ethyl acrylate can be formed, for example, through radical polymerization of a polymerizable composition containing approximately 20 parts by mass or more of ethyl acrylate based on 100 parts by mass of the polymerizable components. In the present disclosure, the term "polymerizable components" refers to components that can be polymerized through the radical polymerization described below. When the term "polymerizable components" is used with respect to parts by mass, this parts by mass means the total mass of these components. Radical polymerization of a polymerizable composition can be performed, for example, through solution polymerization, suspension polymerization, emulsion polymerization, and bulk polymerization.

In an embodiment, the acrylic polymer having approximately 20 mass % or more of a unit derived from ethyl acrylate is formed through emulsion polymerization. The polymerizable composition is typically an oil-in-water (O/W type) emulsion composition. As polymerizable monomers besides ethyl acrylate, alkyl (meth)acrylates typically having an alkyl group with 12 or fewer carbon atoms such as methyl(meth)acrylate, ethyl methacrylate, n-butyl(meth) acrylate, isoamyl (meth)acrylate, 2-methylbutyl (meth)acrylate, n-hexyl (meth)acrylate, 2-ethylhexyl (meth)acrylate, isooctyl (meth)acrylate, isononyl (meth)acrylate, decyl (meth)acrylate, dodecyl (meth)acrylate, cyclohexyl (meth) acrylate), and isobornyl (meth)acrylate, or combinations of two or more types thereof can be contained in the polymerizable emulsion composition.

In several embodiments, based on 100 parts by mass of the polymerizable components of the polymerizable emulsion composition, the compounded amount of the ethyl acrylate is, in total, approximately 20 parts by mass or greater, approximately 22 parts by mass or greater, approximately 24 parts by mass or greater, or approximately 26 parts by mass or greater, and approximately 55 parts by mass or less, approximately 50 parts by mass or less, or approximately 48 parts by mass or less, and the compounded amount of alkyl (meth)acrylates besides the ethyl acrylate is in total, based on 100 parts by mass of the polymerizable components of the polymerizable emulsion composition, approximately 40 parts by mass or greater, approximately 42 parts by mass or greater, or approximately 44 parts by mass or greater, and approximately 70 parts by mass or less, approximately 68 parts by mass or less, or approximately 65 parts by mass or less.

Examples of other monomers that are polymerizable with ethyl acrylate and the abovementioned alkyl (meth)acrylates include phenoxyalkyl (meth)acrylates such as phenoxyethyl (meth)acrylate; alkoxyalkyl (meth)acrylates such as methoxypropyl (meth)acrylate, and 2-methoxybutyl (meth) acrylate; epoxy group-containing monomers such as glycidyl (meth)acrylate, and allyl glycidyl ether; cyclic ether-containing (meth)acrylates such as tetrahydrofurfuryl (meth) acrylate; hydroxyl group-containing monomers such as 2-hydroxyethyl (meth)acrylate, 2-hydroxypropyl (meth) acrylate, and 4-hydroxybutyl (meth)acrylate; carboxyl group-containing monomers such as (meth)acrylic acid, crotonic acid, itaconic acid, fumaric acid, citraconic acid, and maleic acid and acid anhydrides thereof; (meth)acrylonitrile; (meth)acrylamide; or combinations of two or more types thereof.

Hydroxyl group-containing monomers, carboxyl group-containing monomers and acid anhydrides thereof, (meth) acrylonitrile, and (meth)acrylamide are polar monomers having within the molecules thereof a functional group with comparatively high polarity. Polar monomers can impart a high cohesive force to acrylic polymers, and/or can increase interaction between the acrylic polymer and the substrate surface. In several embodiments, the compounded amount of the polar monomer is in total, based on 100 parts by mass of the polymerizable components of the polymerizable emulsion composition, approximately 2 parts by mass or greater, approximately 4 parts by mass or greater, or approximately 6 parts by mass or greater, and approximately 18 parts by mass or less, approximately 15 parts by mass or less, or approximately 13 parts by mass or less.

The polymerizable emulsion composition may contain a polyfunctional monomer as a polymerizable monomer. The polyfunctional monomer functions as a chain extender or crosslinking agent, and contributes to increasing the cohesive force of the acrylic foam layer and reducing adhesive residue. As the polyfunctional monomer, 1,6-hexanediol di(meth)acrylate, ethylene glycol di(meth)acrylate, neopentyl glycol di(meth)acrylate, trimethylolpropane tri(meth) acrylate, poly(ethylene glycol) di(meth)acrylate, poly(propylene glycol) di(meth)acrylate, polybutadiene di(meth) acrylate, polyurethane di(meth)acrylate, diallyl phthalate, divinylbenzene, allyl (meth)acrylate, or combinations of two or more types thereof can be used. In several embodiments, the compounded amount of the polyfunctional monomer is in total, based on 100 parts by mass of the polymerizable components of the polymerizable emulsion composition, approximately 0.1 parts by mass or greater, approximately 0.5 parts by mass or greater, or approximately 1 part by mass or greater, and approximately 10 parts by mass or less, approximately 5 parts by mass or less, or approximately 3 parts by mass or less. In an embodiment, the polymerizable emulsion composition does not contain a polyfunctional monomer.

The polymerizable emulsion composition contains a water soluble or oil soluble polymerization initiator that can be typically used in emulsion polymerization. Examples of the water soluble polymerization initiator that can be used include persulfates such as ammonium persulfate, sodium persulfate, potassium persulfate, and mixtures thereof; a redox reaction initiator containing a reaction product the abovementioned persulfate and a reducing agent such as sodium metabisulfite and sodium bisulfite; and 4,4'-azobis (4-cyanopentanoic acid) and soluble salts thereof (for example, sodium salt and potassium salt). As the water soluble polymerization initiator, persulfates such as ammonium persulfate, sodium persulfate, and potassium persulfate, or mixtures thereof can be advantageously used. Examples of oil soluble polymerization initiators that can be used include organic peroxides such as benzoyl peroxide, lauroyl peroxide, and bis(4-tert-butylcyclohexyl)peroxydicarbonate; and azo-based polymerization initiators such as 2,2'-azobis-isobutyronitrile, 2,2'-azobis(2-methylbutyronitrile), dimethyl 2,2-azobis (2-methylpropionate),4,4'-azobis(4-cyanovaleric acid), dimethyl 2,2'-azobis(2-methylpropionate), and azobis(2,4-dimethylvaleronitrile) (AVN), The polymerization initiator is advantageously a water soluble polymerization initiator. In several embodiments, the compounded amount of the polymerization initiator is typically approximately 0.01 parts by mass or greater or approximately 0.05 parts by mass or greater, and approximately 5 parts by mass or less, or approximately 3 parts by mass or less based on 100 parts by mass of the polymerizable components of the polymerizable emulsion composition.

The polymerizable emulsion composition may contain, as an emulsifier, an anionic surfactant, a cationic surfactant, a nonionic surfactant, or combinations thereof. The hydrophile-lipophile balance (HLB) of the nonionic surfactant can be set to approximately 7 or greater, or approximately 10 or greater, and approximately 19 or less. In several embodiments, the compounded amount of the emulsifier is in total, based on 100 parts by mass of the polymerizable components of the polymerizable emulsion composition, approximately 0.3 parts by mass or greater, approximately 0.5 parts by mass or greater, or approximately 0.8 parts by mass or greater, and approximately 3 parts by mass or less, approximately 2.5 parts by mass or less, or approximately 2 parts by mass or less.

In an embodiment, the emulsifier is an anionic surfactant. Examples of the anionic surfactant include sodium laurate, sodium myristate, sodium stearate, ammonium stearate, sodium oleate, potassium oleate soap, castor oil potassium soap, coconut oil potassium soap, sodium lauroyl sarcosine, sodium myristoyl sarcosine, sodium oleyl sarcosine, sodium cocoyl sarcosine, sodium coconut oil alcohol sulfate, sodium polyoxyethylene lauryl ether sulfate, sodium alkylsulfosuccinate, sodium laurylsulfoacetate, sodium alkylbenzene sulfonates such as sodium dodecylbenzene sulfonate, sodium α-olefin sulfonate, or combinations thereof.

The polymerizable emulsion composition contains ion-exchanged water, for example, as a dispersing medium. The emulsion composition may further contain a water soluble solvent. Examples of the water soluble solvent include alcohols such as methanol, ethanol, isopropanol, ethyl carbitol, ethyl cellosolve, and butyl cellosolve.

The polymerizable emulsion composition may contain a chain transfer agent, a pH adjuster, or other additives, as optional components.

The content of the polymerizable components of the polymerizable emulsion composition can be set to approximately 10 mass % or greater, approximately 20 mass % or greater, or approximately 30 mass % or greater, and approximately 90 mass % or less, approximately 80 mass % or less, or approximately 75 mass % or less.

Emulsion polymerization of the polymerizable emulsion composition can be advanced by heating the composition while stirring. The emulsion polymerization is desirably carried out in an atmosphere of an inert gas such as nitrogen gas or argon gas. The temperature of the emulsion polymerization can be set to not less than approximately 50° C., not less than approximately 60° C., or not less than approximately 70° C., and not greater than approximately 95° C., not greater than approximately 90° C., or not greater than approximately 85° C. The reaction time of the emulsion polymerization can be set to not less than approximately 10 minutes, not less than approximately 30 minutes, or not less than approximately 1 hour, and not greater than approximately 15 hours, not greater than approximately 10 hours, or not greater than approximately 8 hours. The pH of the polymerizable emulsion composition during emulsion polymerization is desirably maintained at approximately 2 or greater, or approximately 3 or greater, and approximately 7 or less, or approximately 6 or less.

The acrylic foam layer can be formed by foaming an acrylic foam precursor that contains an acrylic polymer obtained through emulsion polymerization, molding the foamed acrylic foam precursor into a sheet, and curing the sheet of the foamed acrylic foam precursor. In an embodiment, the acrylic foam precursor is an emulsion composition, and an emulsion containing an acrylic polymer produced through emulsion polymerization can be used in the preparation of the acrylic foam precursor.

Foaming of the acrylic foam precursor can be performed using: a chemical foaming method in which a foaming agent is added to the acrylic foam precursor, and foaming is carried out in the composition; or a mechanical foaming method in which a gas for the formation of air bubbles is dispersed and mixed into the acrylic foam precursor. From the perspective of the chemical stability of the components in the acrylic foam precursor, use of the mechanical foaming method is desirable.

As the gas for the formation of air bubbles of the mechanical foaming method, a gas that is inactive with respect to the components of the acrylic foam precursor is used. Inert gases such as argon and nitrogen, can be used as the gas for the formation of air bubbles, and nitrogen gas is inexpensive and thus can be advantageously used. The amount of gas that is used for the formation of air bubbles can typically be set to approximately 5 vol % or greater, or approximately 10 vol % or greater, and approximately 30 vol % or less, or approximately 20 vol % or less based on the volume of the acrylic foam precursor.

The acrylic foam precursor may contain a flame retardant. The flame retardancy of the acrylic foam layer that is prepared using the acrylic foam precursor, and of the graphic sheet can be increased by using a flame retardant. Use of a flame retardant is particularly beneficial for cases in which the graphic sheet is used in indoor applications that require flame retardancy. As the flame retardant, a halogen-based flame retardant and a non-halogen-based flame retardant can be used for example. A halogen-based flame retardant can impart a high level of flame retardancy, but in order to avoid the generation of halogen gas, use of a non-halogen-based flame retardant is preferable. As the non-halogen-based flame retardant, hydrated metal compounds such as aluminum hydroxide can be used for example. For cases in which aluminum hydroxide is used as the flame retardant, in several embodiments, the compounded amount of aluminum hydroxide is approximately 3 parts by mass or greater, approximately 10 parts by mass or greater, or approximately 15 parts by mass or greater based on 100 parts by mass of the acrylic foam precursor. A practical level of a nonflammable property can be obtained by adding aluminum hydroxide in this range. The compounded amount of aluminum hydroxide is also approximately 27 parts by mass or less, approximately 26 parts by mass or less, or approximately 25 parts by mass or less based on 100 parts by mass of the acrylic foam precursor. A decrease in adhesive force can be suppressed, and a practical level of adhesive force can be obtained by controlling the amount of aluminum hydroxide within this range.

The acrylic foam precursor may contain a thickener. The shape retention of the sheet when the acrylic foam precursor is molded into a sheet can be increased by using a thickener. As the thickener, an acrylic resin emulsion can be used for example. In several embodiments, the compounded amount of the thickener is in total, based on 100 parts by mass of the acrylic foam precursor, approximately 1 part by mass or greater, or approximately 3 parts by mass or greater, and approximately 15 parts by mass or less, or approximately 10 parts by mass or less.

The acrylic foam precursor may contain a foam stabilizer. An air bubble structure that can maintain air bubbles during molding of the acrylic foam layer into a sheet and curing; that can suppress or prevent inclusion of air bubbles into the interface between the graphic sheet and the substrate; and that can enable an exertion of a high level of adhesive force, can be formed by using a foam stabilizer. As the foam stabilizer, for example, anionic surfactants such as a mixture of an alkyl betaine amphoteric substance and a fatty acid alkanolamide and disodium oleamido MEA sulfosuccinate or a combination thereof can be used. In several embodiments, the compounded amount of the foam stabilizer is in total, based on 100 parts by mass of the acrylic foam precursor, approximately 1.0 parts by mass or greater, or approximately 3 parts by mass or greater, and approximately 15 parts by mass or less, or approximately 10 parts by mass or less.

The acrylic foam precursor may contain a crosslinking agent. The strength and cohesive force of the acrylic foam layer can be increased and adhesive residue can be reduced by using a crosslinking agent to crosslink the acrylic polymer. Examples of the crosslinking agent that may be used include isocyanate compounds, melamine compounds, poly(meth)acrylate compounds, epoxy compounds, oxazoline group-containing compounds, amide compounds, and bisamide compounds, e.g., bisaziridine derivatives of a dibasic acid such as 1,1'-isophthaloyl-bis(2-methylaziridine), or combinations thereof. Use of epoxy compounds or isocyanate compounds, and particularly epoxy compounds as the crosslinking agent is advantageous. In several embodiments, the compounded amount of the crosslinking agent is, based on 100 parts by mass of the acrylic polymer, typically approximately 0.1 parts by mass or greater, approximately 0.5 parts by mass or greater, or approximately 1 part by mass or greater, and approximately 30 parts by mass or less, approximately 20 parts by mass or less, or approximately 15 parts by mass or less.

The acrylic foam precursor may contain a flame retardant. By configuring the acrylic foam layer to contain the flame retardant, a graphic sheet that exhibits a nonflammable property in, for example, the heat release test (cone calorimetry) in accordance with ISO 5660-1 can be obtained. As the flame retardant, an organic flame retardant or an inorganic flame retardant can be used. Examples of organic flame retardants include halogen-based flame retardants such as tris(tribromoneopentyl)phosphate and chlorinated paraffin; and phosphate-based flame retardants such as ammonium polyphosphate and tricresyl phosphate. Examples of inorganic flame retardants include metal hydroxides such as aluminum hydroxide and magnesium hydroxide; antimony-based flame retardants such as antimony trioxide. Use of metal hydroxides such as aluminum hydroxide and magnesium hydroxide as the flame retardant is advantageous from perspectives such as maintaining adhesive force and stability. The compounded amount of the flame retardant can be, based on 100 parts by mass of the acrylic polymer, approximately 5 parts by mass or greater, approximately 10 parts by mass or greater, or approximately 12 parts by mass or greater, and approximately 35 parts by mass or less, approximately 30 parts by mass or less, or approximately 28 parts by mass or less.

In several embodiments, for cases in which aluminum hydroxide is used as the flame retardant, favorable flame retardancy can be obtained by setting the content of aluminum hydroxide to approximately 10 parts by mass or greater, and more preferably to approximately 12 parts by mass or greater based on 100 parts by mass of the acrylic polymer. On the other hand, both practical flame retardancy and adhesive force can be maintained by setting the content of aluminum hydroxide to approximately 35 parts by mass or less, and more preferably to approximately 30 parts by mass or less based on 100 parts by mass of the acrylic polymer.

The acrylic foam precursor may contain a filler. By using the filler, the mechanical characteristics of the acrylic foam layer after curing can be increased, processability can be improved, or the product unit cost can be decreased. Examples of the filler include glass beads, polymer hollow microspheres, polymer beads, elastic microspheres, and tacky polymer microspheres.

The acrylic foam precursor may contain other additives such as a tackifier, plasticizer, dye, pigment, crystalline polymer, antioxidant, UV absorbent, and light stabilizer as long as the effect of the invention is not hindered.

A foamed acrylic foam precursor obtained through a mechanical foaming method or the like can be coated onto the base film layer or the liner and molded into a sheet. In an embodiment, the foamed acrylic foam precursor is molded into a sheet on a liner. As the liner, a polymer film such as a polyethylene terephthalate (PET) film, whose surface has been subjected to a release treatment as necessary, can be used.

Curing of the acrylic foam precursor that has been molded into a sheet can be performed through heating, infrared irradiation, or the like. The curing temperature can be set to approximately 100° C. or greater, approximately 120° C. or greater, or approximately 135° C. or greater, and approximately 200° C. or less, approximately 180° C. or less, or approximately 150° C. or less. The curing time can be set to approximately 10 seconds or more, approximately 30 seconds or more, or approximately 1 minute or more, and approximately 30 minutes or less, approximately 15 minutes or less, or approximately 10 minutes or less.

The glass transition temperature (Tg) of the acrylic polymer contained in the acrylic foam layer can be set, for example, to approximately −60° C. or greater, or approximately −50° C. or greater, and approximately 25° C. or less, approximately 0° C. or less, or approximately −10° C. or less. By setting the glass transition temperature of the acrylic polymer within the abovementioned range, the adhesive force of the acrylic foam layer can be regulated so that both the necessary adhesive force and removal ease can be imparted to the acrylic foam layer. The glass transition temperature (Tg) of the acrylic polymer can be determined through the initial peak temperature of a loss tangent (tan δ) by carrying out dynamic viscoelasticity measurements at conditions including a shearing mode, a frequency of 1.0 Hz, a temperature range of from −60° C. to 200° C., and a rate of temperature increase of 5° C./minute. The glass transition temperature (Tg) of the acrylic polymer can be determined by the following Fox equation (Fox, T. G., Bull. Am. Phys. Soc., 1 (1956), p. 123) when the acrylic polymer is formed by copolymerization of n types of monomers.

$$1/Tg = X_1/Tg(Tg_1+273.15) + X_2/(Tg_2+273.15) + \ldots + X_n/Tg_n+273.15)$$

($Tg_1$: Glass transition temperature of the homopolymer of a component 1

$Tg_2$: Glass transition temperature of the homopolymer of a component 2

. . .

$Tg_n$: Glass transition temperature of the homopolymer of a component n $X_1$: Mass fraction of the component 1 added at the time of polymerization $X_2$: Mass fraction of the component 2 added at the time of polymerization

. . .

$X_n$: Mass fraction of the component n added at the time of polymerization $$X_1 + X_2 + \ldots + X_n = 1)$$

In an embodiment, the acrylic foam layer has a microstructured surface having unevenness. When the graphic sheet is affixed to the substrate, air that is sandwiched between the acrylic foam layer surface and the substrate surface is discharged externally through openings formed in the microstructured surface or through passages inside the acrylic foam layer, or is absorbed in the acrylic foam layer, and thus inclusion of observable air bubbles at the interface between the graphic sheet and the substrate can be suppressed or prevented. Therefore, the graphic sheet can be easily applied without the occurrence of appearance defects attributed to residual air bubbles even by a person not skilled in such work.

In an embodiment, the acrylic foam layer is an open cell foam, and open cells configure the openings of the microstructured surface or cavities inside the acrylic foam layer. For example, with the embodiment illustrated in FIG. 1, a microstructured surface 17 of an acrylic foam layer 14, which is an open cell foam, has a plurality of openings 18, and the acrylic foam layer 14 includes cavities 19 communicating with the openings 18 internally. When the graphic sheet is affixed, air that is sandwiched between the acrylic foam layer 14 and the substrate surface passes through the openings 18 and is retained inside the cavities 19, or alternatively, if the cavities 19 are reach an outer edge of the acrylic foam layer, the air is discharged therefrom to the outside. In this manner, inclusion of observable air bubbles into the interface between the graphic sheet and the substrate is suppressed or prevented. For cases in which an open cell foam is used as the acrylic foam layer, the tackiness can be adjusted by adjusting details such as size and number density of the air bubbles, and density, thickness, resin composition, and production conditions of the acrylic foam layer.

The average diameter of air bubbles in the acrylic foam layer may typically be approximately 1 µm or greater, approximately 5 µm or greater, or approximately 10 µm or greater, and approximately 300 µm or less, approximately 250 µm or less, or approximately 200 µm or less. By setting the average diameter of the air bubbles within the abovementioned range, when the graphic sheet is affixed to the substrate, air that is sandwiched between the acrylic foam layer surface and the substrate surface can be retained inside these air bubbles, and a reduction in adhesive force due to penetration of water and the like from the outside can be suppressed. Furthermore, by setting the average diameter of the air bubbles within the abovementioned range, when the base film layer is used as a receptor layer for printing ink, and a solvent ink is used and printed onto the base film layer, a decrease in adhesive force due to the penetration into the acrylic foam layer of solvent that has permeated through the base film layer can also be suppressed.

The average diameter of openings in the microstructured surface of the acrylic foam layer can typically be set to approximately 1 µm or greater, approximately 5 µm or greater, or approximately 10 µm or greater, and approximately 300 µm or less, approximately 250 µm or less, or approximately 200 µm or less. By setting the average diameter of the openings within the abovementioned range, when the graphic sheet is affixed to the substrate, air that is sandwiched between the acrylic foam layer surface and the substrate surface can be quickly moved into the cavities inside the acrylic foam layer.

The area of the openings in the microstructured surface of the acrylic foam layer can be typically set to approximately 1% or greater, approximately 5% or greater, or approximately 10% or greater, and approximately 30% or less, approximately 25% or less, or approximately 20% or less based on the area of the acrylic foam layer. By setting the area of the openings within the abovementioned range, when the graphic sheet is affixed to the substrate, the air that is sandwiched between the acrylic foam layer surface and the substrate surface can be quickly moved into the cavities inside the acrylic foam layer, and the graphic sheet can be fixed onto the substrate with sufficient adhesive force.

The acrylic foam layer may have an open cell structure that has a plurality of spherical cells and through holes between adjacent spherical cells. The average diameter of the spherical cells may be approximately 5 µm or greater and approximately 300 µm or less, and the average diameter of the through holes may be approximately 0.1 µm or greater and less than approximately 5 µm. In several embodiments, the average diameter of the spherical cells is approximately 8 µm or greater or approximately 10 µm or greater, and approximately 100 µm or less or approximately 20 µm or less. In several embodiments, the average diameter of the through holes is approximately 0.5 µm or greater or approximately 1 µm or greater, and approximately 4 µm or less or approximately 3 µm or less.

The air bubble content of the acrylic foam layer can be typically set to approximately 2 vol % or greater, approximately 5 vol % or greater, or approximately 10 vol % or greater, and approximately 30 vol % or less, approximately 25 vol % or less, or approximately 20 vol % or less based on the volume of the acrylic foam layer. By setting the air bubble content within the abovementioned range, the necessary adhesive force and strength can be imparted to the acrylic foam layer.

The density of the acrylic foam layer can typically be set to approximately 0.2 g/cm$^3$ or greater, approximately 0.3 g/cm$^3$ or greater, or approximately 0.5 g/cm$^3$ or greater, and approximately 1.5 g/cm$^3$ or less, approximately 0.9 g/cm$^3$ or less, or approximately 0.7 g/cm$^3$ or less. By setting the density within the abovementioned range, the necessary adhesive force and strength can be imparted to the acrylic foam layer.

The hardness of the acrylic foam layer is not particularly limited, but the acrylic foam layer desirably has such an extent of flexibility that cracks, etc. are not generated due to deformation that occurs in the graphic sheet when the graphic sheet is affixed to and detached from a substrate.

In several embodiments, the loss tangent (tan δ) of the acrylic foam layer at 80° C. is approximately 0.20 or less, approximately 0.19 or less, or approximately 0.18 or less. By setting the tan δ of the acrylic polymer within the abovementioned range, the adhesive force of the acrylic foam layer can be regulated so that both the necessary adhesive force and removal ease can be imparted to the acrylic foam layer. The tan δ of the acrylic polymer can be determined by carrying out dynamic viscoelasticity measurements at conditions including a shearing mode, a frequency of 1.0 Hz, a temperature range of from −60° C. to 200° C., and a rate of temperature increase of 5° C./minute.

In several embodiments, the initial adhesive force of the acrylic foam layer to the substrate at 20° C. is approximately 0.5 N/25 mm or greater, approximately 1 N/25 mm or greater, or approximately 2 N/25 mm or greater. If the initial adhesive force is within the abovementioned range, when the graphic sheet is affixed, the graphic sheet can be adhered and fixed to the substrate with sufficient holding force without peeling.

In several embodiments, the normal adhesive force of the acrylic foam layer to the substrate at 20° C. is approximately 8 N/25 mm or less, approximately 6 N/25 mm or less, or approximately 4 N/25 mm or less. If the normal adhesive force is within the abovementioned range, the graphic sheet can be detached alone from, for example, a wall on which a polyvinyl chloride sheet or the like is attached as a substrate, without damaging the substrate.

These adhesive forces correspond to values that are obtained when a graphic sheet that has been cut to a length of 150 mm and a width of 25 mm is affixed to a target substrate in a 20° C. environment in accordance with JIS Z 0237; and then peeled at 180 degrees at a temperature of 20° C. and a speed of 300 mm/minute using a tensile tester. The initial adhesive force is the adhesive force 20 minutes after the graphic sheet is affixed, and the normal adhesive force is the adhesive force after the graphic sheet has been affixed and then left at room temperature for 24 hours.

The thickness of the acrylic foam layer can typically be set to approximately 10 µm or greater, approximately 20 µm or greater, or approximately 30 µm or greater, and approximately 200 µm or less, approximately 180 µm or less, or approximately 160 µm or less. The thickness of the acrylic foam layer refers to the thickness of the thinnest portion of the acrylic foam layer. By setting the thickness of the acrylic foam layer to be comparatively thin as in the abovementioned range, flexibility of the graphic sheet, and favorable followability to substrate surface such as wallpaper can be ensured.

The area of the adhesive surface of the acrylic foam layer (region at which the acrylic foam layer contacts the substrate and contributes to adhesion) can be set to approximately 1% or greater, approximately 5% or greater, or approximately 10% or greater, and less than 100%, approximately 99% or less, approximately 95% or less, or approximately 90% or less of the area of the acrylic foam layer.

In an embodiment, when viewed from a direction along the thickness of the graphic sheet, the acrylic foam layer is substantially the same shape and area, or is the same shape and area, as those of the base film layer. That is, the acrylic foam layer is present extending over substantially the entire surface, or over the entire surface, of the base film layer. In several embodiments, the area of the acrylic foam layer is approximately 3% or greater, approximately 5% or greater, or approximately 10% or greater, and 100% or less, approximately 95% or less, or approximately 90% or less, of the area of the base film layer.

The acrylic foam layer may be colored. In an embodiment, the acrylic foam layer is colored white. This embodiment is advantageous from perspectives such as the sharpness and coloring of an image when a printed layer is provided on the graphic sheet.

As illustrated in FIG. 1, the graphic sheet 10 may have the liner 16 on the surface of the acrylic foam layer 14 situated on an opposite side of the base film layer 12. Examples of the liner may include paper such as craft paper; polymers such as polyethylene, polypropylene, polyester, and cellulose acetate; and papers coated with such polymers. These liners may have a surface that has been subjected to a release treatment using silicone, fluorocarbon, or the like. The thickness of the liner can typically be set to approximately 5 µm or greater, approximately 15 µm or greater, or approximately 25 µm or greater, and approximately 300 µm or less, approximately 200 µm or less, or approximately 150 µm or less.

Other layers such as, for example, a printed layer or other decorative layer, a surface-protecting layer, a clear layer, and a receptor layer for printing ink may be laminated on the base film layer. These layers may be bonded through a bonding layer. The decorative layer may be disposed so as to correspond to the entire surface of the graphic sheet, or may be disposed so as to correspond to a portion or a plurality of portions thereof.

The printed layer can be used to impart a decorative property or design property through the use of a design or pattern, etc. on the graphic sheet. The printed layer can be formed on the base film layer or receptor layer through printing using a colorant such as toner or ink. A surface-protecting layer or clear layer may be formed on the printed layer. The printed layer may be formed using a printing technique such as gravure printing, electrostatic printing, screen printing, inkjet printing or offset printing. As the printing ink, a solvent-based ink or a UV-curable ink can be used. Various thicknesses may be employed for the printed layer, and ordinarily for cases in which a solvent-based ink is used, the thickness can be approximately 1 µm or greater, or approximately 2 µm or greater, and approximately 10 µm or less, or approximately 5 µm or less. For cases in which a UV-curable ink is used, the thickness can be approximately 1 µm or greater, or approximately 5 µm or greater, and approximately 50 µm or less, or approximately 30 µm or less.

Various resin films can be used as the surface-protecting layer. The surface-protecting layer desirably has flexibility and/or stretchability. Examples of resins that can be used to configure the surface-protecting layer include resins that contain at least any of polyvinyl chloride, a vinyl chloride-vinyl acetate copolymer, polyurethane, acrylic resin, and polyolefin, or combinations thereof. The surface-protecting layer is preferably transparent to, at least visible light. The surface-protecting layer may have a variety of thicknesses, and the thickness can typically be set to approximately 40 µm or greater, approximately 50 µm or greater, or approximately 60 µm or greater, and approximately 200 µm or less, approximately 150 µm or less, or approximately 100 µm or less.

The clear layer can be formed by coating the base film layer, the printed layer or another layer with a composition for forming a clear layer. As the composition for forming the clear layer, a composition that contains an isocyanate reactive resin (for example, a hydroxyl group-containing compound) and an isocyanate-based crosslinking agent can be used. As the isocyanate-reactive resin, for example, the following resins having an isocyanate-reactive functional group such as a hydroxyl group can be used, namely, resins such as fluororesins, phthalate-based polyesters (PET, PEN, etc.), acrylic resins, and petroleum-resistant resins, and combinations thereof. Examples of the isocyanate-based crosslinking agent include aromatic isocyanates such as isophorone diisocyanate, tolylene diisocyanate, diphenylmethane diisocyanate, and xylylene diisocyanate; aliphatic isocyanates such as hydrogenated tolylene diisocyanate, hydrogenated diphenylmethane diisocyanate, hydrogenated xylylene diisocyanate, andhexamethylene diisocyanate; a multimer of tolylene diisocyanate; Coronate L; polyisocyanates such as polymethylene polyisocyanate; and combinations thereof. Regarding the ratio of the isocyanate group of the isocyanate-based crosslinking agent and the isocyanate-reactive functional group of the isocyanate-reactive resin, the value of the (isocyanate group)/(isocyanate-reactive functional group) can be set to approximately 0.3 or greater, approximately 0.5 or greater, or approximately 0.7 or greater, and approximately 1.2 or less, approximately 1.1 or less, and approximately 1.05 or less. The thickness of the clear layer can be set to approximately 1 µm or greater, approximately 2 µm or greater, or approximately 5 µm or greater, and approximately 50 µm or less, approximately 30 µm or less, or approximately 20 µm or less.

Various resin films can be used as the receptor layer. The resin configuring the receptor layer is not particularly limited, and examples of resins that can be used include acrylic polymers, polyolefins, polyvinyl acetals, and phenoxy resins. The glass transition temperature of the resin configuring the receptor layer can typically be from approximately 0° C. to approximately 100° C. By setting the glass transition temperature within the abovementioned range, a vivid image can be obtained through toner transfer or ink printing without impairing the flexibility of the overall graphic sheet. The thickness of the receptor layer may be typically approximately 2 µm or greater, approximately 5 µm or greater, or approximately 10 µm or greater, and approximately 50 µm or less, approximately 40 µm or less, or approximately 30 µm or less.

The bonding layer includes typically-used adhesives such as solvent-type, emulsion-type, pressure-sensitive type, heat-sensitive type, and heat-curable type or ultraviolet-curable type adhesives, including acrylic-based, polyolefin-based, polyurethane-based, polyester-based, and rubber-based adhesives. The thickness of the bonding layer can typically be set to approximately 1 µm or greater, approximately 2 µm or greater, or approximately 5 µm or greater, and approximately 50 µm or less, approximately 40 µm or less, or approximately 30 µm or less. In an embodiment, the graphic sheet is produced by disposing the bonding layer on or above the second surface of the base film layer, and then laminating the acrylic foam layer onto the bonding layer thereof.

The total thickness of the graphic sheet can typically be set to approximately 50 µm or greater, approximately 60 µm or greater, or approximately 80 µm or greater, and approximately 400 µm or less, approximately 350 µm or less, or approximately 300 µm or less. The liner thickness is not included in the total thickness of the graphic sheet. By setting the total thickness of the graphic sheet to be within the abovementioned range, which is comparatively thin, flexibility of the graphic sheet, and favorable followability to substrate surface such as wallpaper can be ensured.

The area of the graphic sheet can typically be set to approximately 50 $cm^2$ or greater, approximately 77 $cm^2$ or greater, or approximately 623 $cm^2$ or greater, and approximately 300 $m^2$ or less, approximately 200 $m^2$ or less, or approximately 100 $m^2$ or less.

The graphic sheet can be adhered to the surface of various types of substrates. For example, when the graphic sheet is used as a graphic sheet for affixing to a surface, that is, when the graphic sheet is adhered to a substrate, the graphic sheet can be used such that an image or the like is visible to an observer when viewed from the first surface side of the base film layer. The graphic sheet is preferably used on a substrate that is comparatively low in strength like wallpaper such as a polyvinyl chloride sheet, or poster. In an embodiment, the substrate is a polyvinyl chloride sheet. The graphic sheet can also be applied on substrates such as plasterboard, glass, a painting sheet, or flooring material. The substrate may be a portion of a building structure such as, for example, a wall, window, floor, ceiling, or column, and each these substrates and the corresponding graphic sheet disposed on the corresponding substrate surface may form a building structure.

EXAMPLES

In the following examples, specific embodiments of the present disclosure are described as examples, but the invention is not limited to these embodiments. All "parts" and "percentages" are based on mass unless specified otherwise.

Dynamic Viscoelasticity Measurements (DMTA)

The storage modulus (G') and the loss tangent (tan δ) of the acrylic foam layer were measured using an ARES-G2 dynamic viscoelasticity measuring device (manufactured by T.A. Instruments Japan, Shinagawa-ku, Tokyo, Japan). The measurement conditions included a shearing mode, a frequency of 1.0 Hz, a temperature range of from −60° C. to 200° C., and a rate of temperature increase of 5° C./minute. The glass transition temperature (Tg) was obtained from the initial peak temperature for tan δ. The Tg and tan δ at 80° C. were recorded as the results of the dynamic viscoelasticity measurements.

Re-Peelability (Adhesive Residue Percentage)

A piece of the graphic sheet cut to a length of 150 mm and a width of 25 mm was used as a test piece. The test piece was affixed on a 3M (registered trademark) DI-NOC (trade name) ME-1174 (from 3M Japan Limited, Shinagawa-ku, Tokyo, Japan) substrate in a 20° C. environment. The affixing method was in accordance with JIS Z 0237. The test piece affixed to the substrate was left for 24 hours at room temperature to cure. After curing, a tensile tester (Tensilon universal tester, model: RTC-1210A, manufactured by A&D Company, Limited, Toshima-ku, Tokyo, Japan) was used to conduct 180° peeling at 20° C. and a rate of 300 mm/min; thereby re-peelability was evaluated by the percentage of adhesive residue. For cases in which adhesive residue was present on the surface of the DI-NOC (trade name) ME-1117, the ratio of the surface area on which adhesive residue remained was expressed as a percentage (%), and when no adhesive residue was present, the percentage was expressed as 0%. Measurements were performed at N=3, and the average thereof was used as the adhesive residue percentage.

Normal Adhesive Force

A piece of the graphic sheet cut to a length of 150 mm and a width of 25 mm was used as a test piece. The test piece was affixed on a 3M (registered trademark) DI-NOC (trade name) ME-1174 (from 3M Japan Limited, Shinagawa-ku, Tokyo, Japan) substrate in a 20° C. environment. The affixing method was in accordance with JIS Z 0237. The test piece affixed to the substrate was left for 24 hours at room temperature to cure. After curing, a tensile tester (Tensilon universal tester, model: RTC-1210A, manufactured by A&D Company, Limited, Toshima-ku, Tokyo, Japan) was used to conduct 180° peeling at 20° C. and a rate of 300 mm/min. Measurements were performed at N=3, and the average thereof was used as the normal adhesive force.

Dimensional Stability

A piece of the graphic sheet cut to a length of 50 mm and a width of 50 mm was used as a test piece. The test piece was affixed on a 3M (registered trademark) DI-NOC (trade name) ME-1174 (from 3M Japan Limited, Shinagawa-ku, Tokyo, Japan) substrate in a 20° C. environment. The test piece affixed to the substrate was cured for 24 hours in a 65° C. oven. After curing, the appearance was confirmed. When defects such as appearance abnormalities and floating (particularly lifting up from the edge portions) were not present, the test piece was determined to be "good", and when appearance abnormalities or floating occurred, the test piece was determined to be "defective".

Tests for flame retardancy, normal adhesive force, re-peelability, and dimensional stability were conducted with the following conditions on Examples 5 to 7 and Comparative Examples 4 and 5.

Flame Retardancy

The graphic sheet sample was cut to prepare a 100 mm square sample, and in accordance with ISO5660-1, a 3M (registered trademark) aqueous primer WP-137M (from 3M Japan Limited, Shinagawa-ku, Tokyo, Japan) was coated onto a nonflammable plasterboard, and the sample and plasterboard were pasted together so that a steel plate and adhesive layer were in contact, and thus a construction material was obtained. This construction material was subjected to thermogenic testing, using a cone calorimeter in accordance with a flame resistance test method and performance evaluation standards based on the Building Standards Act, Article 2(9) and the Enforcement Ordinance of the Building Standards Act, Article 108-2. The evaluation results are as follows.

Total Calorific Value

Pass: 8 $MJ/m^2$ or less

Fail: Greater than 8 $MJ/m^2$ 200 kW Excess Time Pass: Less than 10 seconds

Fail: 10 seconds or less

Normal Adhesive Force

A piece of the graphic sheet cut to a length of 150 mm and a width of 25 mm was used as a test piece. A 3M (registered trademark) aqueous primer WP-137M (from 3M Japan Limited, Shinagawa-ku, Tokyo, Japan) was coated onto a nonflammable plasterboard, and the test piece was affixed thereon in a 20° C. environment. The same conditions as those of the below-described Example 1 were used for the affixing method, tensile tester that was used, and measurement conditions.

Re-Peelability

A piece of the graphic sheet cut to a length of 150 mm and a width of 25 mm was used as a test piece. A 3M (registered trademark) aqueous primer WP-137M (from 3M Japan Limited, Shinagawa-ku, Tokyo, Japan) was coated onto a nonflammable plasterboard, and the test piece was affixed thereon in a 20° C. environment. The same conditions as those of Example 1 were used for the affixing method, tensile tester that was used, and measurement conditions.

Dimensional Stability

A piece of the graphic sheet cut to a length of 50 mm and a width of 50 mm was used as a test piece. A 3M (registered trademark) aqueous primer WP-137M (from 3M Japan Limited, Shinagawa-ku, Tokyo, Japan) was coated onto a nonflammable plasterboard, and the test piece was affixed thereon in a 20° C. environment. The same conditions as those of Example 1 were used for the curing conditions and appearance inspection standards.

Example 1

An acrylic foam precursor for forming the acrylic foam layer was prepared through ordinary emulsion polymerization. An amount of 1.0 parts by mass of sodium dodecylbenzene sulfonate as an emulsifier and 100 parts by mass of ion exchanged water were introduced into a round bottom flask equipped with a thermometer and a condenser, and mixed, after which 44 parts by mass of ethyl acrylate, 46 parts by mass of n-butyl acrylate, and 10 parts by mass of acrylonitrile were added. Next, 0.2 parts by mass of ammonium persulfate was introduced as an initiator, then emulsion polymerization was carried out in a nitrogen atmosphere at 60° C. for 5 hours, and thereby an emulsion containing an acrylic polymer was obtained. Next, 1.0 parts by mass of disodium oleamido MEA sulfosuccinate as a foam stabilizer, and 1.0 parts by mass of Primal (tradename) TT-615 (acrylic resin emulsion, from Dow Chemical Japan Ltd., Shinagawa-ku, Tokyo, Japan) as a thickener were added to 100 parts by mass of the obtained emulsion; these ingredients were mixed with a beater; and thereby an acrylic foam precursor foamed on a micro level was obtained. The obtained acrylic foam precursor was coated onto a release-treated polyester film into a sheet shape and dried for 5 minutes at 140° C. to form an acrylic foam layer having a thickness of 60 μm.

The acrylic pressure sensitive tacky adhesive SK-Dyne (trade name) 1310 (from Soken Chemical & Engineering Co., Ltd., Toshima-ku, Tokyo, Japan) was coated onto a release-treated polyester film, and dried for 5 minutes at 90° C., and a pressure sensitive adhesive layer having a thickness of 8 μm was obtained.

The pressure sensitive adhesive layer was laminated as a bonding layer onto an embossed polyvinyl chloride (PVC) film having a thickness of 90 μm, the acrylic foam layer was laminated thereon, and thereby a graphic sheet of Example 1 was obtained.

Example 2

With the same procedures as those of Example 1, 26 parts by mass of ethyl acrylate, 61.5 parts by mass of n-butyl acrylate, 3.5 parts by mass of acrylic acid, 7 parts by mass of acrylonitrile, and 2 parts by mass of methyl methacrylate were subjected to emulsion polymerization, and thereby an emulsion containing an acrylic polymer was obtained. Next, 1.0 parts by mass of disodium oleamido MEA sulfosuccinate as a foam stabilizer, 6 parts by mass of Denacol (trade name) EX850 (epoxy-based crosslinking agent, from Nagase Chemtex Corporation, Osaka-shi, Osaka-fu, Japan) as a crosslinking agent, and 1.0 parts by mass of Primal (trade name) TT-615 (acrylic resin emulsion, from Dow Chemical Japan Ltd., Shinagawa-ku, Tokyo, Japan) as a thickener were added to 100 parts by mass of the obtained emulsion; these ingredients were mixed with a beater; and an acrylic foam precursor foamed on a micro level was obtained. The obtained acrylic foam precursor was coated onto a release-treated polyester film and dried for 5 minutes at 140° C. to form an acrylic foam layer having a thickness of 60 μm. Next, a graphic sheet of Example 2 was obtained through the same procedures as those of Example 1.

Example 3

With the same procedures as those of Example 2, 26 parts by mass of ethyl acrylate, 49 parts by mass of n-butyl acrylate, 11 parts by mass of 2-ethylhexyl acrylate, 3 parts by mass of acrylic acid, 7 parts by mass of acrylonitrile, and 4 parts by mass of methyl methacrylate were subjected to emulsion polymerization, and thereby an emulsion containing an acrylic polymer was obtained. Next, 1.0 parts by mass of disodium oleamido MEA sulfosuccinate as a foam stabilizer, 6 parts by mass of Denacol (trade name) EX850 (epoxy-based crosslinking agent, from Nagase Chemtex Corporation, Osaka-shi, Osaka-fu, Japan) as a crosslinking agent, and 1.0 parts by mass of Primal (trade name) TT-615 (acrylic resin emulsion, from Dow Chemical Japan Ltd., Shinagawa-ku, Tokyo, Japan) as a thickener were added to 100 parts by mass of the obtained emulsion; these ingredients were mixed with a beater; and an acrylic foam precursor foamed on a micro level was obtained. The obtained acrylic foam precursor was coated onto a release-treated polyester film and dried for 5 minutes at 140° C. to form an acrylic foam layer having a thickness of 60 μm. Next, a graphic sheet of Example 3 was obtained through the same procedures as those of Example 1.

Example 4

With the same procedures as those of Example 2, 45 parts by mass of ethyl acrylate, 46 parts by mass of n-butyl acrylate, 2 parts by mass of acrylic acid, and 7 parts by mass of acrylonitrile were subjected to emulsion polymerization, and thereby an emulsion containing an acrylic polymer was obtained. Next, 1.0 parts by mass of disodium oleamido MEA sulfosuccinate as a foam stabilizer, 4.5 parts by mass of DICNAL GX (methyl methacrylate-2-isopropenyl-2-oxazoline copolymer, from DIC Corporation, Itabashi-ku, Tokyo, Japan) as a crosslinking agent, and 1.0 parts by mass of Primal (trade name) TT-615 (acrylic resin emulsion, from Dow Chemical Japan Ltd., Shinagawa-ku, Tokyo, Japan) as a thickener were added to 100 parts by mass of the obtained emulsion; these ingredients were mixed with a beater; and thereby an acrylic foam precursor foamed on a micro level was obtained. The obtained acrylic foam precursor was coated onto a release-treated polyester film and dried for 5 minutes at 140° C. to form an acrylic foam layer having a thickness of 60 μm. Next, a graphic sheet of Example 4 was obtained through the same procedures as those of Example 1.

Comparative Example 1

With the same procedures as those of Example 2, 15 parts by mass of ethyl acrylate, 49 parts by mass of n-butyl acrylate, 18 parts by mass of 2-ethylhexyl acrylate, 5 parts by mass of acrylic acid, 4 parts by mass of acrylonitrile, and 9 parts by mass of methyl methacrylate were subjected to emulsion polymerization, and thereby an emulsion containing an acrylic polymer was obtained. Next, 1.0 parts by mass of disodium oleamido MEA sulfosuccinate as a foam stabilizer, 8 parts by mass of Denacol (trade name) EX859 (epoxy-based crosslinking agent, from Nagase Chemtex Corporation, Osaka-shi, Osaka-fu, Japan) as a crosslinking agent, and 1.0 parts by mass of Primal (trade name) TT-615 (acrylic resin emulsion, from Dow Chemical Japan Ltd., Shinagawa-ku, Tokyo, Japan) as a thickener were added to 100 parts by mass of the obtained emulsion; these ingredients were mixed with a beater; and an acrylic foam precursor foamed on a micro level was obtained. The obtained acrylic foam precursor was coated onto a release-treated polyester film and dried for 5 minutes at 140° C. to form an acrylic foam layer having a thickness of 60 μm. Next, a graphic sheet of Comparative Example 1 was obtained through the same procedures as those of Example 1.

Comparative Example 2

With the same procedures as those of Example 2, 13 parts by mass of ethyl acrylate, 50 parts by mass of n-butyl acrylate, 22 parts by mass of 2-ethylhexyl acrylate, 4 parts by mass of acrylic acid, 3 parts by mass of acrylonitrile, and 8 parts by mass of methyl methacrylate were subjected to emulsion polymerization, and thereby an emulsion containing an acrylic polymer was obtained. Next, 1.0 parts by mass of disodium oleamido MEA sulfosuccinate as a foam stabilizer, 7 parts by mass of Denacol (trade name) EX859 (epoxy-based crosslinking agent, from Nagase Chemtex Corporation, Osaka-shi, Osaka-fu, Japan) as a crosslinking agent, and 1.0 parts by mass of Primal (trade name) TT-615 (acrylic resin emulsion, from Dow Chemical Japan Ltd., Shinagawa-ku, Tokyo, Japan) as a thickener were added to 100 parts by mass of the obtained emulsion; these ingredients were mixed with a beater; and an acrylic foam precursor foamed on a micro level was obtained. The obtained acrylic foam precursor was coated onto a release-treated polyester film and dried for 5 minutes at 140° C. to form an acrylic foam layer having a thickness of 60 μm. Next, a graphic sheet of Comparative Example 2 was obtained through the same procedures as those of Example 1.

The monomer compositions of the acrylic polymers contained in the acrylic foam layers of Examples 1 to 4 and Comparative Examples 1 and 2 are shown in Table 1, and the evaluation results of the respective graphic sheets are shown in Table 2.

TABLE 1

(Numerical values correspond to parts by mass.)

| | Example 1 | Example 2 | Example 3 | Example 4 | Comparative Example 1 | Comparative Example 2 |
|---|---|---|---|---|---|---|
| Ethyl acrylate | 44 | 26 | 26 | 45 | 15 | 13 |
| n-butyl acrylate | 46 | 61.5 | 49 | 46 | 49 | 50 |
| 2-ethylhexyl acrylate | — | — | 11 | — | 18 | 22 |
| Acrylic acid | — | 3.5 | 3 | 2 | 5 | 4 |
| Acrylonitrile | 10 | 7 | 7 | 7 | 4 | 3 |
| Methyl methacrylate | — | 2 | 4 | — | 9 | 8 |
| Total | 100 | 100 | 100 | 100 | 100 | 100 |

TABLE 2

| | Tg (° C.) | tanδ (80° C.) | Adhesive Residue Percentage (%) | Normal Adhesive Force (N/25 mm) | Dimensional Stability |
|---|---|---|---|---|---|
| Example 1 | 6.6 | 0.10 | 0 | 4 | Good |
| Example 2 | −1.2 | 0.17 | 0 | 4 | Good |
| Example 3 | −0.3 | 0.16 | 0 | 4 | Good |
| Example 4 | −5.7 | 0.19 | 0 | 4 | Good |
| Comparative Example 1 | 0.3 | 0.22 | 80 | 5 | Good |
| Comparative Example 2 | −2.1 | 0.21 | 100 | 5 | Good |

Example 5

An acrylic foam precursor for forming the acrylic foam layer was prepared through ordinary emulsion polymerization. An amount of 1.0 parts by mass of sodium dodecylbenzene sulfonate as an emulsifier and 100 parts by mass of ion exchanged water were introduced into a round bottom flask equipped with a thermometer and a condenser, and mixed, after which 45 parts by mass of ethyl acrylate, 46 parts by mass of n-butyl acrylate, 7 parts by mass of acrylonitrile, and 2 parts by mass of acrylic acid were added. Next, 2.5 parts by mass of disodium oleamido MEA sulfosuccinate as a foam stabilizer, 4.5 parts by mass of an oxazoline-based crosslinking agent (DICNAL GX, from DIC Corporation, Itabashi-ku, Tokyo, Japan) as a crosslinking agent, 1.0 parts by mass of Primal (trade name) TT-615 (acrylic resin emulsion, from Dow Chemical Japan Ltd., Shinagawa-ku, Tokyo, Japan) as a thickener, and 12 parts by mass of Hygilite (from Showa Denko Kabushiki Kaisha, Minato-ku, Tokyo, Japan) as a flame retardant (aluminum hydroxide) were added to 100 parts by mass of the obtained emulsion; these ingredients were mixed with a beater; and an acrylic foam precursor foamed on a micro level was obtained. The obtained acrylic foam precursor was coated onto a release-treated polyester film into a sheet shape and dried for 5 minutes at 140° C. to form an acrylic foam layer having a thickness of 60 μm. Next, a graphic sheet of Example 5 was obtained through the same procedures as those of Example 1.

Graphic sheets of Examples 6 and 7 and Comparative Examples 3 and 4 were prepared with the same conditions as those of Example 5 with the exception of changing only the addition amount of aluminum hydroxide. The addition amount of aluminum hydroxide for each example and the evaluation results of the graphic sheets are shown in Table 3.

TABLE 3

| | | Nonflammable Property | | | | |
|---|---|---|---|---|---|---|
| | Aluminum Hydroxide (parts by mass) | Total Calorific Value (MJ/m$^2$) | Excess Time (s) | Normal Adhesive Force (N/25 mm) | Re-peelability | Dimensional Stability |
| Example 4 | 12 | Pass | Pass | 1.2 | 0 | Good |
| Example 5 | 20 | Pass | Pass | 0.8 | 0 | Good |
| Example 6 | 25 | Pass | Pass | 0.8 | 0 | Good |
| Comparative Example 3 | 28 | Pass | Pass | 0.4 | 0 | Defective |
| Comparative Example 4 | 0 | Fail X | Pass | 1.5 | 0 | Good |

Various modifications of the disclosed embodiments and examples will be apparent to those skilled in the art without departing from the basic principle of the invention. It is also obvious to a person skilled in the art that various improvements and modifications to the present invention can be implemented without departing from the spirit and scope of the invention.

REFERENCE SIGNS LIST

10: Graphic sheet
12: Base film layer
14: Acrylic foam layer
16: Liner
17: Microstructured surface
18: Opening
19: Cavity

The invention claimed is:

1. A graphic sheet capable of being affixed to and detached from a substrate, the graphic sheet comprising:
a base film layer having a first surface and a second surface situated on an opposite side of the first surface; and
a tacky acrylic foam layer disposed on or above the second surface of the base film layer, the acrylic foam layer containing an acrylic polymer having 20 mass % or more and 55 mass % or less of a unit derived from ethyl acrylate.

2. The graphic sheet according to claim 1, wherein an initial adhesive force of the acrylic foam layer at 20° C. is 0.5 N/25 mm or greater, and a normal adhesive force at 20° C. is 8 N/25 mm or less when fixed to a polyvinyl chloride sheet.

3. The graphic sheet according to claim 1, wherein a loss tangent (tanδ) of the acrylic foam layer at 80° C. is 0.20 or less in a shearing mode at a frequency of 1.0 Hz.

4. The graphic sheet of claim 1, wherein the acrylic foam layer comprises an open cell structure comprising a plurality of spherical cells and through holes between adjacent spherical cells.

5. The graphite sheet of claim 1, wherein the substrate is a polyvinyl chloride sheet.

6. The graphic sheet of claim 1, wherein the acrylic foam layer has a thickness of 200 μm or less.

7. The graphic sheet of claim 1, wherein the acrylic foam layer contains a flame retardant.

8. The graphic sheet according to claim 7, wherein the flame retardant contains aluminum hydroxide.

9. A building structure comprising a substrate, and the graphic sheet described in claim 1, the graphic sheet being arranged on a surface of the substrate.

10. The building structure according to claim 9, wherein the substrate is a polyvinyl chloride sheet.

11. A method of producing a graphic sheet capable of being affixed to and detached from a substrate, the method comprising:
providing a base film layer having a first surface and a second surface situated on an opposite side of the first surface;
forming a tacky acrylic foam layer; and
arranging a bonding layer on or above the second surface of the base film layer, and laminating the acrylic foam layer onto the bonding layer, the forming the acrylic foam layer comprising:
foaming an acrylic foam precursor containing an acrylic polymer having 20 mass % or more and 55 mass % or less of a unit derived from ethyl acrylate;
molding the foamed acrylic foam precursor into a sheet; and
curing the sheet of the foamed acrylic foam precursor.

12. The method according to claim 11, wherein the acrylic foam precursor contains a flame retardant.

13. The method according to claim 12, wherein the flame retardant contains aluminum hydroxide.

* * * * *

UNITED STATES PATENT AND TRADEMARK OFFICE
CERTIFICATE OF CORRECTION

PATENT NO. : 11,530,339 B2
APPLICATION NO. : 16/769685
DATED : December 20, 2022
INVENTOR(S) : Masami Miura et al.

Page 1 of 1

It is certified that error appears in the above-identified patent and that said Letters Patent is hereby corrected as shown below:

In the Claims

<u>Column 22</u>
Line 12, In Claim 3, delete "(tans)", and insert -- (tanδ) --, therefor.

Signed and Sealed this
Thirty-first Day of October, 2023

Katherine Kelly Vidal
*Director of the United States Patent and Trademark Office*